United States Patent
Böning et al.

(10) Patent No.: US 9,539,676 B2
(45) Date of Patent: Jan. 10, 2017

(54) METHOD FOR THE PRODUCTION OF A HEAT EXCHANGER HAVING A TUBULATOR INSERT

(75) Inventors: Wilhelm Böning, Lichtenau (DE); Rolf Lange, Salzkotten (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 1201 days.

(21) Appl. No.: 13/551,084

(22) Filed: Jul. 17, 2012

(65) Prior Publication Data

US 2013/0180689 A1 Jul. 18, 2013

(30) Foreign Application Priority Data

Jul. 19, 2011 (DE) .................. 10 2011 051 935

(51) Int. Cl.
| | |
|---|---|
| *B23P 15/26* | (2006.01) |
| *F28F 1/40* | (2006.01) |
| *B21C 37/15* | (2006.01) |
| *B21C 37/22* | (2006.01) |
| *F28F 9/16* | (2006.01) |

(52) U.S. Cl.
CPC .............. *B23P 15/26* (2013.01); *B21C 37/158* (2013.01); *B21C 37/225* (2013.01); *F28F 1/40* (2013.01); *F28F 9/162* (2013.01); *F28F 2275/04* (2013.01); *F28F 2275/06* (2013.01); *Y10T 29/49391* (2015.01)

(58) Field of Classification Search
CPC ...... B23P 15/26; B21C 37/158; B21C 37/225; F28F 9/162; F28F 1/40; F28F 2275/06; F28F 2275/04; Y10T 29/49391
See application file for complete search history.

(56) References Cited

U.S. PATENT DOCUMENTS

| | | | | |
|---|---|---|---|---|
| 3,702,021 | A * | 11/1972 | Wolfe ..................... | B21D 53/04 165/153 |
| 5,105,540 | A * | 4/1992 | Rhodes ................. | F28D 1/0391 228/183 |
| 5,456,006 | A * | 10/1995 | Study .................... | B21C 37/155 29/890.049 |
| 5,771,962 | A | 6/1998 | Evans et al. | |
| 2007/0044939 | A1 | 3/2007 | Hummel et al. | |
| 2009/0126919 | A1 | 5/2009 | Bensel et al. | |
| 2009/0179337 | A1* | 7/2009 | Lundgreen ................ | F24F 6/18 261/115 |

FOREIGN PATENT DOCUMENTS

| | | |
|---|---|---|
| DE | 19713356 A1 | 11/1997 |
| DE | 600 23 992 T2 | 12/2000 |
| DE | 20118511 U1 | 3/2002 |
| DE | 103 28 274 | 1/2004 |
| DE | 202006016339 U1 | 2/2007 |

(Continued)

*Primary Examiner* — Ryan J Walters
(74) *Attorney, Agent, or Firm* — Henry M. Feiereisen LLC

(57) ABSTRACT

In a method for the production of a heat exchanger, a turbulator insert is placed into a heat exchanging tube, with the turbulator insert having a solder applied thereon in at least one region. Weld spots using resistance welding are formed on an inner surface of the heat exchanging tube with the turbulator insert, and the inner surface of the heat exchanging tube is interlinked with the turbulator insert through brazing.

13 Claims, 2 Drawing Sheets

(56) References Cited

FOREIGN PATENT DOCUMENTS

| DE | 102006032406 A1 | 1/2008 |
| DE | 112006002196 T5 | 9/2008 |
| DE | 102007047294 | 4/2009 |
| DE | 202009016426 U1 | 6/2010 |
| DE | 102009012509 A1 | 9/2010 |

* cited by examiner

METHOD FOR THE PRODUCTION OF A HEAT EXCHANGER HAVING A TUBULATOR INSERT

CROSS-REFERENCES TO RELATED APPLICATIONS

This application claims the priority of German Patent Application, Serial No. 10 2011 051 935.1, filed Jul. 19, 2011, pursuant to 35 U.S.C. 119(a)-(d), the content of which is incorporated herein by reference in its entirety as if fully set forth herein.

BACKGROUND OF THE INVENTION

The present invention relates to a method for the production of a heat exchanger, and to a heat exchanger.

The following discussion of related art is provided to assist the reader in understanding the advantages of the invention, and is not to be construed as an admission that this related art is prior art to this invention.

Plate heat exchangers are known in the state of the art for use as coolers in the field of automobile construction. These plate heat exchangers include a plurality of stacked, trough-shaped heat exchanging plates having circumferential edges which bear upon one another and are snugly brazed with each another. As an alternative, flat tubes, for example rectangular tubes but also oval tubes, are arranged in an outer tube, with a first medium flowing through the tubes and a second medium flowing about the tubes, i.e. between outer tube and inner tube.

To increase the surface area for transfer of heat, the arrangement of ribs or also turbulators has been proposed in at least one of the afore-mentioned flow passages.

It would be desirable and advantageous to obviate prior art shortcomings by providing an improved heat exchanger which can be made in a cost-efficient way and with superior product accuracy.

SUMMARY OF THE INVENTION

According to one aspect of the present invention, a method for the production of a heat exchanger includes placing a turbulator insert into a heat exchanging tube, with the turbulator insert having a solder applied thereon in at least one region, forming weld spots using resistance welding on an inner surface of the heat exchanging tube with the turbulator insert, and interlinking the inner surface of the heat exchanging tube with the turbulator insert through brazing.

In accordance with the present invention, a turbulator insert is fixed in position in the heat exchanging tube by a resistance welding process after being inserted in the heat exchanging tube. The inner surfaces of the heat exchanging tube are positioned in close proximity, substantially air gap free, against the surface of the turbulator insert by the spot welds realized through resistance welding. The subsequent brazing step results in a material joint between the inner surface of the heat exchanging tube and the turbulator insert, establishing optimal heat conduction during operation of the heat exchanger.

As the surfaces of the turbulator insert and the inner surface of the heat exchanging tube lie in close proximity to one another via the at least spotwise implemented resistance weld seams and/or resistance weld spots, solder can be dispersed in an optimum manner between the two adjacent surfaces. It will be understood that the reference to the surface of the turbulator insert in combination with the coupling of the inner surface of the heat exchanger involves only the section that comes actually into contact. For example, when a finned or lamelliform turbulator insert is involved, only those regions of the amplitudes of the fins, as viewed in cross section, are referred to. The inner surface of the heat exchanger then constitutes the corresponding region for the brazing process. Advantageously, the adjacent regions are fully interlinked by a material joint through the brazing process.

According to another advantageous feature of the present invention, the turbulator insert can be configured in the form of a finned plate having fins configured to point in a longitudinal direction of the heat exchanging tube. The turbulator insert causes an increase of the inner surface area of the heat exchanger to enable a circulating medium to give off a greater heat output or to dissipate a greater heat output from this medium. Heat dissipation is hereby established in particular by a forced convection. Of particular benefit is the generated turbulent flow so that the finned plate may have in addition a corrugated shape in flow direction or include additional turbulators in the form of elevations or like nubs.

According to another advantageous feature of the present invention, depressions, e.g. notches, may be formed in the heat exchanging tube. The notches may hereby be oriented in particular orthogonal to a length direction of the fins or lamellae of the finned plate or turbulator insert.

As a result of the presence of inwardly pointing depressions or notches, the outer tube is recessed is such a manner that the inserted turbulator insert is fixed in place in the heat exchanging tube. A formfitting engagement is established between an inner side of the notch and the turbulator insert. When applying a current to the heat exchanging tube, resistance welding will cause a fusion of the inner side of the notch with the turbulator insert. It is possible within the scope of the invention to add additional brazing agent, for example a brazing paste or solder applied in a different way, to enhance the quality of the brazed joint produced subsequently.

As a result of the locally high current density, it is even possible in some circumstances to produce a welded connection between the turbulator insert and the inwardly oriented notches. This causes a fusion of the notch and the finned plate so that the tube inner side of the notch is leveled and a homogenous minimal brazed and/or welded joint is generated.

The restrained placement of the turbulator insert by the notches eliminates the need for additional weighting of the heat exchanging tube with a weight or application of a pressure force, as conventionally proposed heretofore, for proper execution of a brazing process. By establishing a material joint and alignment through application of an electric current, there is no need for the subsequent brazing process to weigh down the structure being produced by using weights or other apparatuses. Thus, the present invention enables a production of for example several heat exchangers at the same time which can be brazed in a furnace while being positioned side-by-side or stacked for example. This decreases production costs.

According to another advantageous feature of the present invention, the turbulator insert can be securely fixed in the heat exchanging tube. Advantageously, this can be realized by clamping the turbulator insert in the heat exchanging tube. As a result, it is ensured that the turbulator insert is arranged with great accuracy in the desired position within the heat exchanging tube and is fixed in place and at the same time can be interlinked by a material joint at the contact sites where clamping occurs. This enhances precision of the production method according to the present invention while effectively utilizing the clamping action to lower production costs.

According to another advantageous feature of the present invention, the depressions can be formed in the heat exchanging tube before the turbulator insert is placed into the heat exchanging tube or after the turbulator insert is placed into the heat exchanging tube. Depending on the application at hand for the heat exchanger to be produced and the used materials, it can be advantageous to first place the turbulator insert in the heat exchanging tube, subsequently clamp the turbulator insert through formation of the depressions so as to be restrained, and then couple the turbulator insert with the heat exchanging tube via the depressions.

In a different configuration, which, for example, is dependent also on the inner geometry of the heat exchanging tube and again on the used materials, the depressions are formed already before the turbulator insert is placed into the heat exchanging tube. This effects a superior guidance as the turbulator insert is placed into the heat exchanging tube and fixed in place once inserted.

Of course, it may also be possible to provide a combination of the afore-described two method variants involving initially the formation of depressions in an end region or midsection of the heat exchanging tube, then placement of the turbulator insert in the heat exchanging tube, and subsequently formation of depressions in the remaining regions. It is hereby possible to size the depressions formed first to project into the heat exchanging tube to a lesser extent than the depressions formed later so that the first depressions enable easy insertion and guidance of the turbulator insert into the heat exchanging tube, whereas the second depressions fix the turbulator insert in place.

According to another advantageous feature of the present invention, a welding current may be applied to a top side and to an underside of the heat exchanging tube. A current may hereby be applied of such intensity as to attain a welding process. In particular when a flat tube is involved, e.g. a rectangular tube or oval tube, top side and underside relate both to the long sides of the flat tubes. This ensures application of the welding current in the area of the depressions as a result of the inherent resistance of the material being involved so as to provide sufficiently high current strength intensity to establish the required temperature level for the welding process.

According to another advantageous feature of the present invention, the heat exchanging tube can be arranged in an outer tube, and an inner flange can be placed in an end region of the outer tube for fixedly securing the heat exchanging tube. A heat exchanger according to the present invention may have two or more heat exchanging tubes in the outer tube. Thus, a first flow passage is established between the outer tube and the heat exchanging tube, and a second flow passage is established within the heat exchanging tube so that two media can be conducted, with a heat exchange taking place between the two media. The inner flange provides a securement and maintains even spacing of the heat exchanging tube within the outer tube and can be used exclusively as spacer and/or in addition as tube bottom, i.e. sealing body.

According to another advantageous feature of the present invention, the heat exchanging tube and the inner flange and/or the outer tube and the inner flange can be brazed at least in one region thereof. The brazed joint again ensures that the inner flange does not shift during operation by the internal pressure applied by the flowing media. In the event of a compete brazing, the spacer serves in addition as tube bottom and/or sealing cover.

According to another aspect of the present invention, a heat exchanger includes an outer tube, a heat exchanging tube received in the outer tube and having a turbulator insert, and an inner flange arranged in an end region of the outer tube between an inner surface of the outer tube and an outer surface of the heat exchanging tube, wherein at least one of the outer surface and the inner surface has at least one region brazed to the inner flange.

According to another advantageous feature of the present invention, the inner flange may be a shaped structure made from a sheet metal blank. As a result, the inner flange can be produced in a cost-efficient way while still exhibiting a wide range of degree of freedom in the event of a refinishing process, for example separating process, e.g. through laser cutting or the like. At the same time, the inner flange as a result of the sheet metal construction adds only little weight to the heat exchanger being produced so that the demand in particular by the automobile industry for low weight is met for all components.

According to another advantageous feature of the present invention, the inner flange can have a receiving opening having at least one region contoured to complement an outer contour of the heat exchanging tube for receiving the heat exchanging tube, with the heat exchanging tube bearing upon the inner flange in the at least one region. In this way, the presence of an optimal press fit is ensured by the inner flange, especially when using several heat exchanging tubes which are configured in particular as flat tubes, e.g. oval-shaped flat tubes. When the inner flange is brazed to the heat exchanging tube, a minimal brazing gap can be realized between the inner flange and the heat exchanging tube and also between the outer tube and the inner flange. This enhances product quality of the heat exchanger being produced and decreases any production tolerances to a negligible level.

According to another advantageous feature of the present invention, the outer contour of the heat exchanging tube can track the recess of the inner flange plate. Advantageous is hereby the presence of a fit, e.g. clearance fit.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
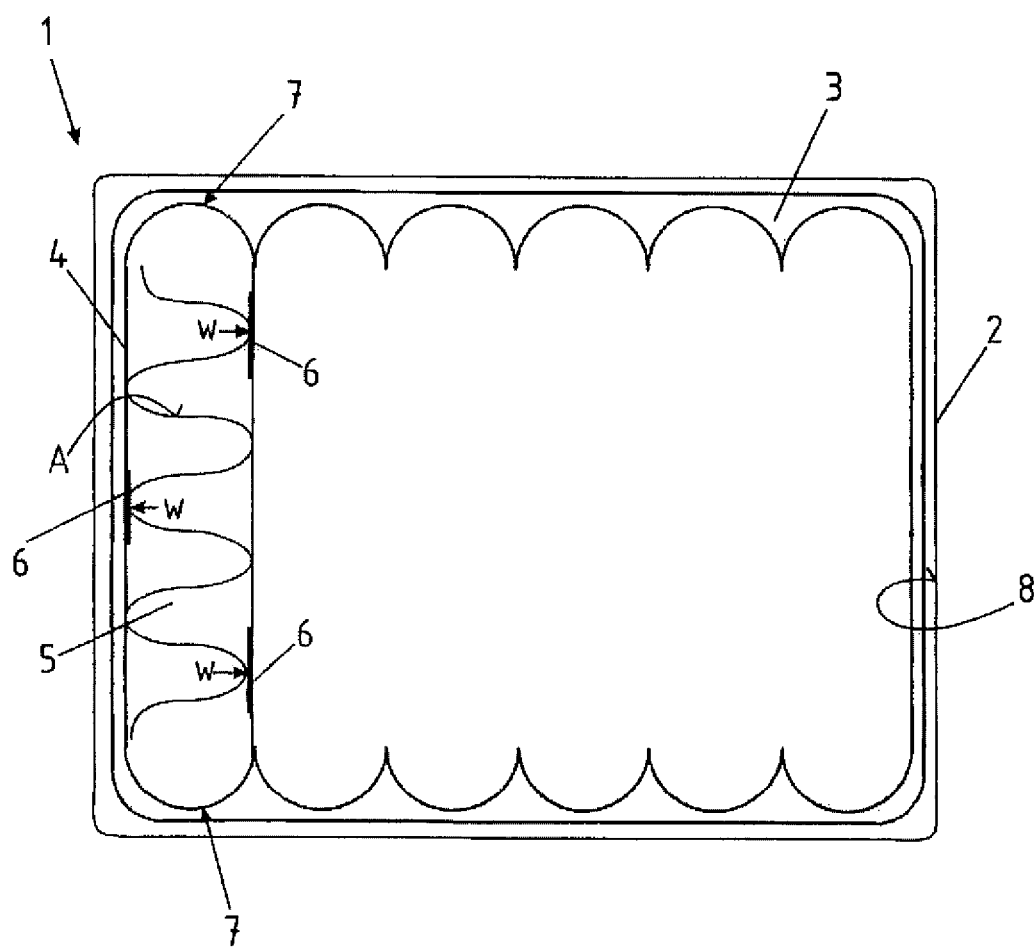
FIG. 1 is a cross sectional view of a heat exchanger according to the present invention.

Throughout all the figures, same or corresponding elements may generally be indicated by same reference numerals. These depicted embodiments are to be understood as illustrative of the invention and not as limiting in any way.

It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a cross sectional view of a heat exchanger according to the present invention, generally designated by reference numeral 1. The heat exchanger 1 includes an outer tube 2 which receives several heat exchanging tubes 4 with the assistance of an inner flange 3. For sake of simplicity, FIG. 1 shows only one heat exchanging tube 4 on the left-hand side of the drawing plane. Arranged in the heat exchanging tube 4 is a finned or lamelliform plate 5 to increase the surface area A for heat transfer. In order for the finned plate 5 to be restrained in place in the heat exchanging tube 4 and to additionally establish a heat bridge for heat conduction W, notches 6 are formed in the heat exchanging tube 4 which press against the finned plate 5 and are brazed with the finned plate 5 in this region. The heat exchanging tubes 4 in turn are formfittingly interlinked with the inner flange 3 at an arcuate section 7. A brazed joint may optionally be provided in the region of the arcuate section 7 to provide an added material joint. The inner flange 3 in turn is interlinked with an internal surface 8 of the outer tube 2. This connection may also be realized by a material joint.

Figure 2:
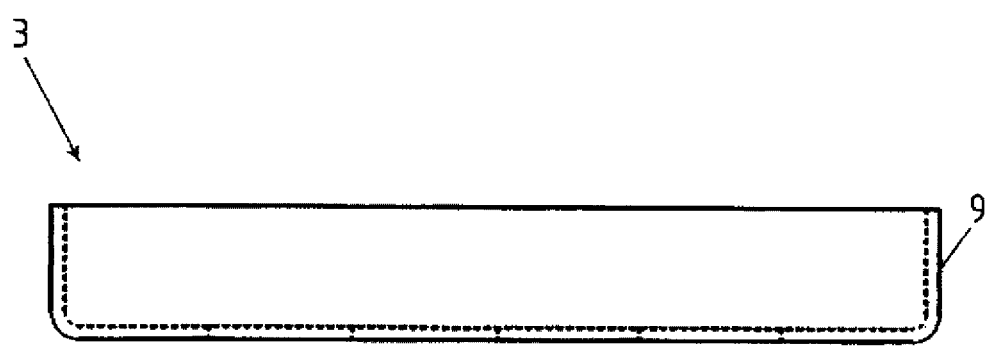
FIG. 2 is a cross sectional view of an inner flange of the heat exchanger of FIG. 1.

FIG. 2 shows a cross sectional view of the inner flange 3 which is formed as shaped sheet metal part. The inner flange 3 has a collar 9 which is in contact with an inner surface of the outer tube, not shown here.

Figure 3:
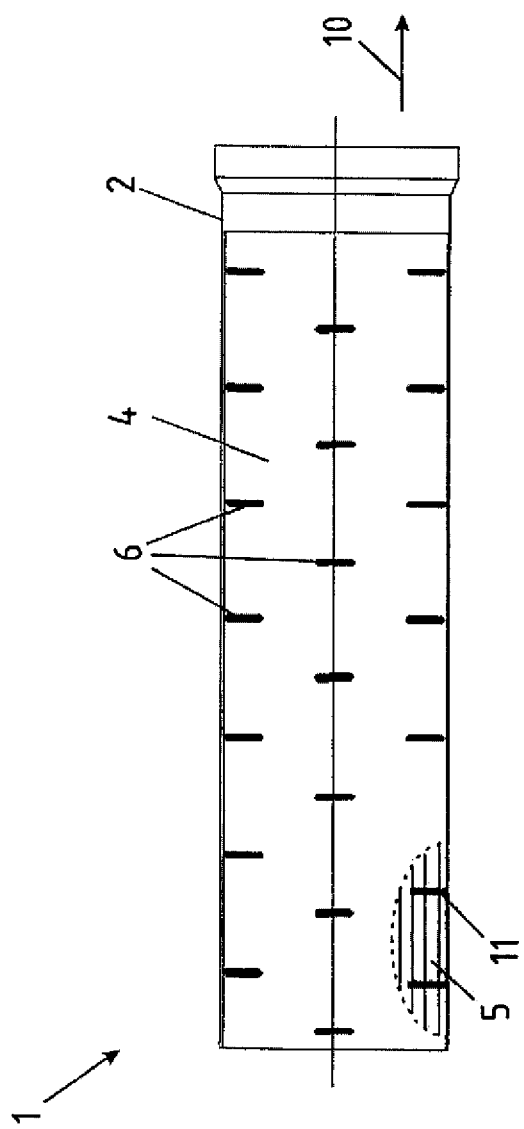
FIG. 3 is a top plan view of a heat exchanger according to the present invention.

FIG. 3 shows a top plan view of a heat exchanger 1 according to the present invention. Arranged in the outer tube 2 is a heat exchanging tube 4 which is formed with several notches 6. The notches 6 are primarily oriented at a 90° angle to a length direction 10 of the fins (not shown in greater detail) of the finned plate 5. As a result, contact is established at the intersection points 11 between each fin of the finned plate 5 and the associated corresponding notch 6. Using resistance welding, a connection is established in the intersection points in accordance with the present invention.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for the production of a heat exchanger, comprising:
   placing a turbulator insert into a heat exchanging tube, with the turbulator insert having a solder applied thereon in at least one region;
   forming weld spots using resistance welding on an inner surface of the heat exchanging tube to form a connection with the turbulator insert, wherein the turbulator insert is fixed in position in the heat exchanging tube substantially air-gap free by the resistance welding; and
   interlinking the inner surface of the heat exchanging tube with the turbulator insert through brazing.

2. The method of claim 1, wherein the turbulator insert is configured in the form of a finned plate having fins configured to point in a longitudinal direction of the heat exchanging tube.

3. The method of claim 1, further comprising forming depressions in the heat exchanging tube.

4. The method of claim 3, wherein the depressions are configured as notches.

5. The method of claim 3, wherein the depressions are formed in the heat exchanging tube in one of two ways, a first way before the turbulator insert is placed into the heat exchanging tube, a second way after the turbulator insert is placed into the heat exchanging tube.

6. The method of claim 3, wherein a first depression is formed in an end region or midsection of the heat exchanging tube before the turbulator insert is placed in the heat exchanging tube, and subsequently a second depression is formed in a remaining region of the heat exchanging tube.

7. The method of claim 6, wherein the first depression is sized to project into the heat exchanging tube to a lesser extent than the second depression.

8. The method of claim 1, wherein the turbulator insert is securely fixed in the heat exchanging tube.

9. The method of claim 8, wherein the turbulator insert is clamped in the heat exchanging tube.

10. The method of claim 1, further comprising applying a welding current to a top side and to an underside of the heat exchanging tube.

11. The method of claim 10, further comprising forming depressions in the heat exchanging tube, wherein the welding current is applied at such intensity to establish a welded joint between an inner side of the depressions and the turbulator insert.

12. The method of claim 1, further comprising arranging the heat exchanging tube in an outer tube, and placing an inner flange in an end region of the outer tube for fixedly securing the heat exchanging tube.

13. The method of claim 12, further comprising brazing at least one region of at least one combination selected from the group consisting of heat exchanging tube and inner flange, and outer tube and inner flange.

\* \* \* \* \*